Patented June 26, 1934

1,964,009

UNITED STATES PATENT OFFICE 1,964,009

PROCESS OF MANUFACTURE OF SAUSAGES

Charles H. Vogt, Philadelphia, Pa.

No Drawing. Application September 7, 1927,
Serial No. 218,113

4 Claims. (Cl. 99—11)

The present invention relates to novel sausage products and processes of manufacturing and marketing the same.

More particularly the invention relates to sausages having edible and more readily digestible manufactured external protective membranes or skins thereon formed of nitrogenous or protein matter, and to the process of forming such membranes or skins in the manufacture of such sausages, and to the method of preserving the same in desirable marketable condition for a substantial period of time after manufacture.

In the ordinary methods in use of making sausages, particularly those of the Frankfurter type, the meat mixture consisting of beef, pork, spices, condiments, and sometimes cereals, is stuffed into casings derived from the intestines of various animals. The intestines of all animals, however, are not adapted for use as casings in sausage manufacture, the best type of casing being sheep casings, but for the lower grade Frankfurters tougher hog casings are frequently used. Besides being objectionable because of their derivation, the great demand for casings has resulted in organizations which collect casings for the market throughout the world, necessitating their shipment and preservation and which render them objectionable from a sanitary viewpoint as well as costly.

The scarcity, cost, and disadvantages of suitable natural casings have long been recognized and various methods have been proposed whereby casingless sausages, or sausages not encased in the casings derived from the intestines of animals are produced. The first known method disclosed in U. S. patent to Boyle #1,009,953 comprises forming the sausages by placing the meat mixture in a mold, submerging the sealed mold in a hot water bath, and heating for a short time to a temperature of 155° to 160° Fahrenheit to effect a cooking of the external surface of the sausages in contact with the sides of the mold, and thereby produce a coating or thin crust of cooked meat thereon which is composed of the same material as the body of the sausages. This process while long known has not met with commercial success due to the fact that the heating of the external surfaces of the sausages as proposed in the aforementioned patent causes the coagulation of the coagulable proteins and partial cooking of the remaining proteins ordinarily contained in the surface of the sausage meat in contact with the mold, and results in the formation of a crust or coating about the exterior surface of the sausages. The proteins normally present on the surface of the meat mixture are not generally of the proper structure nor present in sufficient quantity to form a smooth protecting membrane or skin over the surfaces of the sausages, a satisfactory coating having been discovered to require the presence of more proteins and nitrogenous substances of different and generally less complex structure than are normally present in the fresh meat mixture as will more fully hereinafter appear. This coating or crust above referred to also in practice generally adheres to the walls of the mold and is broken as the sausages are being expelled therefrom, leaving a rough uneven and unattractive surface. This coating or crust is also of a coarse open texture, is irregular and uneven, is readily affected by air and moisture and possesses little elasticity and tensile strength. Neither does such a coating simulate in appearance sausages encased in animal casings, nor does it possess the properties inherently present in casing sausages and even if marketed immediately after production they do not find a ready market, while the deterioration is very rapid. Due to the cooking of such surface of the sausages prior to smoking, the surface is of such a nature that a satisfactory smoke or cure is imparted thereto with difficulty.

Accordingly, an object of this invention is the production of casingless sausages having a protective external membranes or skins thereon formed of a substantial percentage of nitrogenous or protein matter which simulates in appearance the ordinary casing sausages and possesses substantially greater tensile strength than the strength of a cooked crust of the sausage meat of equal thickness.

Another object of this invention is the production of casingless sausages having protective external membranes or skins thereon formed by the combined physical, chemical and bacterial action on the nitrogenous or protein matter normally contained in the fresh meat mixture of which the sausage is made.

A further object of this invention resides in the provision of novel processes for making casingless sausages whereby protective external membranes or skins are formed around the sausages containing substantial quantities of nitrogenous protein matter of generally more simple structure than is normally contained in the fresh sausage meat.

A still further object of this invention is the provision of a novel process for making sausages whereby the protein matter contained in the sausages is formed by the breaking down or partial breaking down and re-arrangement of the proteins and meat constituents naturally present in the fresh sausage meat mixture to form protective membranes or skins about the exterior surface of the sausages.

Further objects of the invention will appear from the more detailed description of this invention hereinafter set forth, it being understood that various changes may be made therein by those skilled in the art without departing from the scope of my invention, as defined by the scope of the appended claims.

By way of example, a preferred process now in successful commercial use for forming my improved sausages comprises forming the uncooked meat mixture of which the sausages are made into the desired shape, and then subjecting the formed sausage to controlled apparently physical, chemical, and bacterial action in and on the protein and nitrogenous matter of the sausage meat mixture thereby effecting the formation of protective membranes or skins containing substantial quantities of protein or nitrogenous matter of generally less complex structure than the proteins normally present in the fresh meat, about the exterior surfaces of the sausages. The uncooked sausages are subjected to a smoking action to effect the usual curing of the product and in addition to effect a toughening and strengthening of the protective membranes or skins and then cooked after smoking, if desired.

Excellent sausages may be produced in accordance with this invention by proceeding in the following manner. A meat mixture is formed by mixing together beef and pork, preferably in the ratio of 200 pounds of beef to 180 pounds of pork, and adding the usual spices and other common ingredients of sausage mixtures thereto. The mixture is then subjected to a disintegrating or chopping action, and comminuted to the required degree, and preferably to a comparatively fine state.

During the chopping or disintegration of the sausage mixture it is preferred to add a certain amount of water in the form of ice. The addition of the ice serves the double function of initially reducing the temperature of the meat mixture, and supplying the mixture with water in addition to the natural moisture contained in the meat from which the mixture is formed.

The sausage mixture thus prepared is then stuffed or packed into molds of the desired size and shape. This may be done by the ordinary sausage stuffer or any of the other well-known elements designed for such purpose. The molds may be made of any construction but tubular molds made of aluminum or material of like character which will inhibit the contamination of the meat when in contact therewith are preferably used. In place of tubular molds being employed in the step of preforming the sausages, molds which open lengthwise may be used if desired. The tubular molds made of aluminum are, however, preferred. Whatever the construction of the molds employed may be it is important that the interior surface of the molds be smooth so that the exterior surfaces of the preformed sausages may be smooth and even in character.

The molds loaded with the sausage mixture are then transferred to a cooling room maintained at a suitable temperature, preferably from about 0° to 48° Fahrenheit. The molds are retained in the cooling room for a period of time sufficient to permit the sausages to set to the form of the molds preferably without freezing so that they will retain their shape after being removed from the mold, and preferably until a smooth glossy coating forms around the surfaces of the sausages. The time required to cause setting of the sausage will depend upon the temperature of the cooling room and upon the initial temperature and condition of the meat mixture. It has been found that the sausages in the molds ordinarily set within 2 hours to 24 hours time, at the expiration of which time the molds are removed from the cooling room. Experiments show, however, that by lowering the cooling room temperatures the setting may be speeded, and due to leaving the meat in the cooler for longer periods of time, the sausages having been permitted in practice to set in the cooler for as long as 48 hours or more.

The formed sausages which have been set to shape in the molds are then removed from the molds in any desired manner. If the formed sausages are in tubular molds, the sausages may be ejected therefrom by means of a plunger. The sausage thus removed from the molds are placed upon open mesh wire screens to facilitate the handling thereof during subsequent operations.

The casingless sausages as they come from the molds generally have a smooth glassy appearance, are fairly firm to the touch, and retain their form. During the chilling or cooling step, a "setting" takes place, probably due partly to the solidification of the fat and also partly to the absorption of water by the colloids.

In one method of carrying out my invention, the formed sausages are allowed to remain upon the wire screens for a period of approximately 25 minutes to three hours, exposed to normal air or forced air currents at temperatures of from about 30 to 120 degrees Fahrenheit, the time depending upon the temperatures and volume of air contacting with the sausage, and being less for the higher temperatures and higher volumes. During this time the sausages become at first soft to the touch as they warm to room temperature, but retain sufficient firmness to hold their shape. Gradually a protective coating or membrane forms about the exterior surface of the individual sausages. Such protective membrane is apparently the result of a combined physical, chemical, and bacterial action in the protein or nitrogenous matter contained in the sausages adjacent to and at the exterior surface of the sausages.

The screens supporting the formed sausages may then be transferred to an ordinary smokehouse wherein they are further dried while being smoked to the desired degree. While any suitable method of smoking may be utilized, preferably the smoking is so regulated that it begins at a temperature of approximately 120° Fahrenheit and concludes when a temperature of approximately 165° to 170° Fahrenheit is reached. The smoking period, when carried out in the preferred manner, requires approximately from two to four hours, depending upon atmospheric conditions and the initial condition of the sausages. During the smoking process the protective membranes formed about the exterior surfaces of the sausages by the cooling and ageing in air is firmly fixed or set, and is toughened to the desired degree. It has been found that the tensile strength of such membrane is increased by conducting the smoking within the temperature limits of 120° to 170° Fahrenheit rather than carrying out the entire smoking operation at a temperature of approximately 165° Fahrenheit.

The sausages thus smoked are then transferred to a cooker or cooking room and are cooked for a period of approximately six to eight minutes at a temperature preferably of approximately 170 degrees Fahrenheit. The cooking is preferably carried out in an atmosphere of water vapor, although other methods of cooking may be employed if desired. This cooking step may be omitted entirely if desired. The cooking of the sausages further toughens and increases the tensile strength of the protective membranes formed about the exterior surfaces of the individual sausages.

The screens supporting the smoked and cooked sausages having the uniform protective membranes formed about the exterior surfaces thereof are then transferred to a cooling room where they are cooled to the desired temperature for their preparation for market.

The skins or membranes formed on the sausages in carrying out the process as above set forth initially simulates in appearance the animal casing ordinarily used on Frankfurters and sausages but differs materially from animal casings in that it is wholly edible, more readily digestible and has a high food value, but when exposed to air the skin or membrane rapidly changes form, becoming darker and toughening. My improved sausages must, therefore, be specially handled in order to permit the practical marketing thereof, as in ordinary atmosphere the sausages rapidly dry out and toughen unless they are kept cold, and rapidly become unsuitable for marketing. If a light membrane is formed initially, and the sausages are kept cold the skin will in its first exposure to air become slightly tougher and darker coming to a more satisfactory marketable condition before deterioration from a marketing viewpoint sets in.

To permit practical marketing of my novel product without special refrigeration, I have discovered that it is essential to further encase the sausages in a medium substantially impervious to atmosphere and moisture, and so treating my improved sausages after they have been completed and are ready for the market forms an important step in the practical marketing and commercialization of my improved product.

By suitably and carefully wrapping each individual casingless sausage completely in waxed paper, or in suitable grades of parchment or other suitable material, substantially impervious to moisture and atmosphere, I have found that the sausages will remain in moist and marketable condition for ample time to permit the marketing of the product under the most adverse conditions normally met in practice. In wrapping or encasing the sausages for marketing, care must be taken that the wrapper is secured around the sausages in such manner as to completely enclose the same and substantially hermetically seal it so that moisture is retained in the sausage and contact with atmosphere is prevented.

To insure a rapid and efficient encasing and sealing operation, a special wrapping machine forming no part of the present invention has been provided and it is found that by providing sufficient wax paper, parchment, or other suitable materials to permit the ends of the wrapper to overlap a substantial amount and by carefully twisting the ends of the wrapper, sausages may be practically and economically sealed to impart the necessary keeping qualities.

I have discovered that instead of conditioning the formed sausages in air as above set forth, the skins or membranes may be formed by subjecting the preformed uncooked sausages to a very moist warm atmosphere for a period of time depending upon the nature of the skin or membrane desired to be formed and then subjecting to a warm dry air current to form the membranes. When the sausages are removed from the warm moist atmosphere no substantial skin formation appears but after a short period of time in the warm dry air, an excellent skin or membrane forms. The skins or membranes may also be formed by subjecting the preformed uncooked sausages to a warm air current carrying some moisture. By regulating the moisture, and temperature conditions to which the sausages are subjected the thickness and toughness of the skins or membranes on the sausages may be controlled to have desirable marketable characteristics. For excellent results have been secured by treating sausages as expelled from the molds in a water vapor bath at approximately 90 to 92 degrees F. for about 15 minutes, and then drying or conditioning in a comparatively dry air current at a temperature of approximately 80 degrees Fahrenheit for a period of five minutes.

In an endeavor to determine the composition of the protective membranes formed about the exterior surfaces of casingless sausages manufactured in the manner above described as well as the cause of their formation, exhaustive investigations have been made, the results of which indicate that the membranes are formed by the breaking down of the proteins, nitrogenous and like compounds contained in the meat into simpler compounds, and indicate that the material for a suitable skin or membrane can be formed independently of the sausage meat proper and can be applied to the sausage by dipping or spraying or like operations, and such methods of forming my improved product are contemplated as within the scope of my invention.

The analyses and investigations together with results are as follows:

Comparative analyses were made on the fresh comminuted meat mixture, the artificial outer membrane before smoking, and the internal meat of the Frankfurter after the membrane had formed and before the Frankfurters were smoked.

These analyses show in a striking manner the change that takes place during the setting period in the cold room. A detailed outline of the figures obtained will give a better ground upon which to discuss the changes.

|  | Original comminuted meat | Artificial outer membrane | Interior of Frankfurter after storing and formation of membrane |
|---|---|---|---|
|  | Percent | Percent | Percent |
| Moisture | 63.61 | 34.87 | 56.52 |
| Fat | 19.76 | 43.38 | 26.53 |
| Total protein | 13.56 | 18.37 | 13.30 |
| Water soluble protein | 2.45 | 4.64 | 3.32 |
| Coagulable protein | 1.13 | 1.40 | 1.04 |
| Gelatin proteoses | 0.887 | 3.02 | 2.08 |
| Amino nitrogen | 0.035 | 1.089 | 0.044 |

| Moisture and fat free basis | Original comminuted meat | Artificial outer membrane | Interior of Frankfurter after storing and formation of membrane |
|---|---|---|---|
| Total protein | 81.53 | 84.46 | 79.64 |
| Water soluble protein | 14.73 | 21.33 | 19.58 |
| Coagulable protein | 6.79 | 6.43 | 6.13 |
| Gelatin proteoses | 6.33 | 13.88 | 12.27 |
| Amino nitrogen | 0.21 | 0.40 | 0.25 |

Comparing these figures it is readily noted that there is an increase in the water soluble proteins (serums, gelatin, proteoses, etc.) after storage and that this increase is slightly greater in the newly formed membrane. While there is practically 15 percent of water soluble proteins in the freshly comminuted meat mixture, there is present in the meat mixture after the cooling period approximately 19.5 percent, and in the membrane 21.5 percent. There is also a change in the character of these water soluble proteins towards the point of simpler compounds, this may be readily seen by the following figures:

|  | Original comminuted meat | Artificial outer membrane | Interior of Frankfurter after storing and membrane formation |
|---|---|---|---|
| Percent total protein as water soluble protein | 18.06 | 25.25 | 24.58 |
| Percent total protein as water soluble coagulable protein | 8.32 | 7.61 | 7.69 |
| Percent total protein as gelatin-proteoses, etc. | 6.53 | 16.43 | 15.40 |
| Percent water soluble protein as coagulable protein | 46.09 | 30.14 | 31.30 |
| Percent water soluble protein as gelatin-proteoses, etc. | 36.18 | 65.07 | 62.66 |

In the original comminuted meat there is 6.53 percent of proteoses based upon the total protein content whereas in the chilled sample there is a rapid rise to 15.40 in the interior and 16.43 in the membrane. The water soluble coagulable protein, however, does not decrease in proportion to the increase of the proteose proteins. This would distinctly point to a change in the structure of the proteins which of course, means a change in the properties and this change indicates hydrolysis of the protein molecule, and that the coating or membrane is largely composed of the hydrolyzed proteins.

Numerous tests were made by subjecting formed sausages and the meat mixtures spread on slides to air, oxygen, carbon dioxide, and hydrogen, and microscopic examinations under transmitted and reflected light were made of the skin formations. Qualitative tests were made for the presence of amino acids which were suspected as an evidence of the breaking down of protein or protein like compounds, for such compounds were positive, varying in degree with the progression of skin formation. Tests for bacterial activity under aerobic and anaerobic conditions indicate the fact that the skin or membrane formation is aided by the bacteria or Flora naturally present in the meat, and under conditions that promote bacterial activity the skin formation is more rapid and may be controlled to produce a skin of desirable marketing characteristics. The tests also indicate that a substantial degree of dehydration is essential to the formation of a suitable skin or membrane of desirable characteristics.

The outstanding and apparently characteristic feature of the skin formations was the disappearance of the definite outline of the meat fibres with the appearance of a true homogeneity of surface. The production of this homogeneity could be observed in its successive stages especially well in the case of the pure beef samples. The fact that amino acids commonly known to be the result of the breaking down of proteins and similar compounds are found to be present in increasing amounts as the skin formation proceeds is evidence that the action is accompanied by a chemical change which is apparently hydrolytic and possibly oxidation, while the dehydration which seems essential is physical in nature.

It is accordingly concluded from the experiments described that the formation of a comparatively tough skin on the surface of sausage mixture as submitted is due to a combined physical, bacterial and chemical action during which nitrogenous, protein, or protein like compounds are broken down into simpler compounds and for which the presence of moisture and a dehydrating action are important.

The smooth, tough, elastic skin formed on the surface of the commonly used sausage mixture by exposure to the air and possessing a greater tensile strength than the individual units from which it is formed is produced, or may be produced as the result of a combined physical, bacterial and chemical action in a dehydrating atmosphere containing an oxidizing element or oxygen containing compound with the simultaneous production of amino acids. The characteristics of the skin are its smoothness, elasticity, and tensile strength and the gradual and final, partial or complete disappearance of the individual outline of the meaty fibres to give place to an homogeneous whole acting as a protective coating to the formed sausage, and which is distinctly and physically separable from the interior of the sausage. The evenness and smoothness of the membrane is apparently due to the increase in the water soluble proteins through hydrolysis, or other chemical or bacterial action, and certain proteose proteins produced during hydrolysis are apparently essential in the formation of the membrane. Furthermore the membrane of the smoked Frankfurter is apparently fixed by the process of smoking, which coagulates the coagulable water soluble proteins and "sets" the other proteins present.

While a preferred process and comparative analyses of a preferred form of membrane and sausage meat mixture have been given considerable detail, it will be apparent to those skilled in the art that the details of my invention may be varied widely without departing from the scope thereof as defined by the appended claims. For example, it will be recognized by those skilled in the art that in view of the fact that hydrolytic, chemical, bacterial, physical and oxidizing actions apparently enter into the formation of the skin or membrane, the relative constituents of the membrane may vary widely according to the conditions under which the sausage is formed and the combinations of actions that are permitted to predominate. It is not necessary that the sausages be preformed in molds as set forth, and the reactions then permitted to proceed in and on the preformed sausages as by a proper combination of the proper proteins and other constituents of the membranes the coating may be formed on the sausages by dipping or spraying. The sausage meat may also be stuffed into suitable confining casings with sufficient porosity to permit the necessary actions and reactions to proceed, or may be subject to proper hydrolyzing conditions to break down the proteins in the meat mixture to form a suitable skin or membrane of higher protein content than the natural protein content of the meat, and in which the protein content is of different composition and generally of less complex nature than the natural protein content of the fresh untreated meat mixture.

Accordingly having described preferred embodiments only of the invention, what is desired to be secured by Letters Patent and claimed as new is:

1. The method of forming a membrane on a comminuted meat mixture molded in the form of a sausage, which consists in subjecting the sausage to a temperature of 120° Fahrenheit or less to initially form a relatively tender membrane thereon, and then increasing the temperature to about 170° Fahrenheit to toughen the membrane.

2. The method of forming a membrane on a comminuted meat mixture molded in the form of a sausage, which consists in subjecting the sausage to air currents maintained at a temperature between 30° and 120° Fahrenheit to initially form a relatively tender membrane thereon, and then increasing the temperature to about 170° Fahrenheit in a smokehouse to toughen the membrane.

3. The method of forming skinless sausages which consists in molding a comminuted meat mixture in the form of a sausage having smooth surfaces, subjecting the molded sausage to a temperature of 120° Fahrenheit or less to initially form a relatively tender membrane thereon, and then increasing the temperature to about 170° Fahrenheit to toughen the membrane.

4. The method of forming skinless sausages which consists in molding a comminuted meat mixture in the form of a sausage having smooth surfaces, subjecting the molded sausage to air currents maintained at a temperature between 30° and 120° Fahrenheit to initially form a relatively tender membrane thereon, and then increasing the temperature to about 170° Fahrenheit in a smokehouse to toughen the membrane.

CHARLES H. VOGT.